United States Patent
Verhoeven

(10) Patent No.: US 12,402,566 B2
(45) Date of Patent: Sep. 2, 2025

(54) MONITORING VIBRATIONS IN AGRICULTURAL HARVESTERS

(71) Applicant: CNH Industrial America LLC, New Holland, PA (US)

(72) Inventor: Marcel Verhoeven, Zedelgem (BE)

(73) Assignee: CNH Industrial America LLC, New Holland, PA (US)

(*) Notice: Subject to any disclaimer, the term of this patent is extended or adjusted under 35 U.S.C. 154(b) by 787 days.

(21) Appl. No.: 17/702,893

(22) Filed: Mar. 24, 2022

(65) Prior Publication Data
US 2022/0304239 A1    Sep. 29, 2022

(30) Foreign Application Priority Data
Mar. 26, 2021  (EP) .................................... 21165125

(51) Int. Cl.
*A01F 12/44* (2006.01)
*A01D 41/127* (2006.01)

(52) U.S. Cl.
CPC ........ *A01F 12/446* (2013.01); *A01D 41/1276* (2013.01)

(58) Field of Classification Search
CPC ........ A01F 12/446; A01F 12/58; A01F 12/18; A01D 41/1276; A01D 75/18; A01D 41/127; A01D 41/12; A01D 41/1278; G01M 13/045
See application file for complete search history.

(56) References Cited

U.S. PATENT DOCUMENTS

| | | | |
|---|---|---|---|
| 5,995,910 A * | 11/1999 | Discenzo | G01H 1/003 702/56 |
| 6,843,044 B2 | 1/2005 | Clauss | |
| 8,763,461 B2 | 7/2014 | Hamatani et al. | |
| 2006/0020402 A1 | 1/2006 | Bischoff et al. | |
| 2006/0276949 A1 | 12/2006 | Beck et al. | |
| 2017/0102290 A1 | 4/2017 | Haye | |

(Continued)

FOREIGN PATENT DOCUMENTS

| CN | 2666122 Y | 12/2004 |
|---|---|---|
| CN | 204482336 U | 7/2015 |

(Continued)

OTHER PUBLICATIONS

Extended European Search Report for EP Application No. 21165125.2 dated Sep. 17, 2021 (8 pages).

*Primary Examiner* — Michael C Zarroli
(74) *Attorney, Agent, or Firm* — Buchanan Ingersoll & Rooney PC

(57) ABSTRACT

A method for determining a vibration pattern in a crop processing section of an agricultural harvester. The method may start with bringing the crop processing section into a predetermined pseudo-operational configuration. When in the predetermined pseudo-operational configuration, a plurality of vibration sensors is used to establish a reference vibration pattern. The established reference vibration pattern is then stored in a memory. Analysis of the reference vibration pattern may provide useful information about a current mechanical status of moving as well as stationary parts. Vibration patterns of many agricultural harvesters may be gathered in a cloud and processed using AI tools.

12 Claims, 3 Drawing Sheets

(56) References Cited

U.S. PATENT DOCUMENTS

2018/0119807 A1\* 5/2018 Dannerbauer ...... B60W 10/101
2019/0020290 A1 1/2019 Feng et al.
2019/0391174 A1 12/2019 Tatar et al.

FOREIGN PATENT DOCUMENTS

DE 102013222154 A1 4/2015
EP 3636067 A1 4/2020

\* cited by examiner

MONITORING VIBRATIONS IN AGRICULTURAL HARVESTERS

TECHNICAL FIELD

The present invention relates to a method of determining a vibration pattern in a crop processing section of an agricultural harvester and to a computer program for carrying out that method.

BACKGROUND

Agricultural machinery comprises many moving parts that, during use, cause as well as endure a lot of vibration. Vibration leads to wear of, e.g., the bearings supporting the moving parts. Bearing wear may cause imbalances in the same moving parts, which may lead to a further increase of vibrations. If bearings are not greased, aligned, or replaced in time, this may lead to severe damage to the agricultural machine. Such damage may not only affect the moving parts themselves, but also the chassis that supports them.

The damaging effect of such vibration is even more prominent in crop processing sections of agricultural machinery. Crop processing sections have to deal with high torques and loads, and an often uneven supply of crop. The instant workload on different parts of the crop processing sections is highly variable and is often different for different portions of the same moving part. The volume and consistency of the processed crop varies a lot between and within different harvesting sessions, depending on crop type, weather conditions, and geographical location. On top of that, e.g., stones and other non-crop material, uneven supply of crop, or an inclined position of the agricultural machine lead to an uneven load distribution throughout the crop processing units.

To avoid unexpected damage to the agricultural machine and ensure timely maintenance of its bearings and other vibration sensitive parts, regular inspection and maintenance of the agricultural machine and its moving parts is highly important to increase the lifetime of the machine and to ensure the proper functioning of the machine when it is needed in the fields. To monitor the vibrations occurring during use of the agricultural machine and to enable a user to act when abnormal vibrations arise, it is known to equip the moving parts and/or their support structures with one or more vibration sensors.

For example, the German patent application published as DE 10 2013 222 154 A1 discloses a combination of a tractor and an implement. The implement is connected to and driven by a power take-off (PTO) of the tractor. A vibration sensor is mounted on the PTO housing and detects vibrations of the tractor and the implement. When, during use, a vibration threshold is exceeded, a warning signal may be provided, or the operation may be interrupted. Different thresholds are stored in a memory and associated with different types of implements and different PTO output speeds.

Although this approach may solve some of the vibration related problems to a certain extent, it does come with several problems. One of these problems is that it is almost impossible to define the proper thresholds that allow the monitoring system to distinguish between acceptable and excessive vibrations. Differences in ground surface, drive speed, weather, field inclination, grain tank filling level, crop type, crop density, and many other external factors can have large effects on the measured vibrations. Vibration patterns that can be considered perfectly normal today, may indicate serious mechanical issues tomorrow and vice versa. To avoid false alarms, thresholds need to be set at a relatively high level, which may lead to serious problems being detected too late.

In, e.g., a combine harvester with a large amount of rotating and reciprocating parts, different thresholds need to be determined for a large number of vibration sensors. With many moving parts that can be controlled to move at different speeds and frequencies, different thresholds may be needed, not just for different crops and harvesting conditions, but also for different combinations of operational settings. In order to ensure that not too many false alarms or undetected problems occur, all the separate vibration sensors will need a very large amount of different thresholds that are difficult to determine accurately.

It is an aim of the present invention to address one or more disadvantages associated with the prior art.

SUMMARY OF THE INVENTION

According to an aspect of the invention there is provided a method of determining a vibration pattern in a crop processing section of an agricultural harvester. The method may start with bringing the crop processing section into a predetermined pseudo-operational configuration. When in the predetermined pseudo-operational configuration, a plurality of vibration sensors is used to establish a reference vibration pattern. The established reference vibration pattern is then stored in a memory.

The pseudo-operational configuration mimics the operational status of the agricultural harvester and its crop processing section during an actual harvesting operation. Rotatable and reciprocatable elements of the crop processing section are run at predetermined frequencies, comparable to their operation frequencies when used in the field. Adjustable elements of the crop processing sections may be brought into a position and/or orientation that also represents normal use. An important difference between the pseudo-operational status and an actual operational status is that no crop is harvested or processed. The functional units of the agricultural harvester, in particular those of the crop processing section, run as if an actual harvesting process is going on, while the harvester is standing still on a preferably horizontal surface.

By eliminating the variability of any circumstances that are difficult or impossible to control, such as uneven ground surfaces, varying drive speed, weather, field inclination, crop type, and crop density, an accurate reference vibration pattern can be determined under known and standardised circumstances. When such a reference vibration pattern is determined for a new agricultural harvester, it can be compared to previously determined reference vibration patterns of similar agricultural harvesters to detect any mechanical problem or defect in the agricultural harvester being tested. Later, this reference vibration pattern may be used to detect when and where maintenance of the crop processing section may be needed.

In, e.g., a combine harvester, the pseudo-operational state may involve operating a feeding, threshing, cleaning, and residue processing section at predetermined frequencies that are equal or similar to the frequencies that are generally used when harvesting crop at high capacity. Sieve openings, concave clearances and counter knife positions may be set to predetermined values representative of such a harvesting operation. If a header is attached, the header may be operated at a similar predetermined cutting frequency. In a forage harvester, the pseudo-operational state may involve activating a header, feed rolls, cutter drum, crop processor, and/or blower. For a baler, the pseudo-operational state may, e.g., involve running the pickup rotor, crop cutter, stuffer and plunger at frequencies resembling those used in a normal bale forming operation.

Preferably, the method according to the invention further comprises, bringing the crop processing section into the predetermined pseudo-operational configuration again, and, when in the predetermined pseudo-operational configuration, using the plurality of vibration sensors to establish a current vibration pattern. The thus established current vibration pattern can be used in several different ways. For example, it may be used for comparing the established current vibration pattern to the stored reference vibration pattern, and based on the comparison, providing an output signal representative of a change of vibration pattern of the crop processing section. For example, when the vibration amplitude of one of the vibration sensors exceeds the vibration amplitude stored in the reference vibration pattern by more than a predetermined percentage, an alarm signal may be communicated to the user, indicating which sensor recorded the excessive vibrations. The user can then choose to inspect the parts of the crop processing section associated with that vibration sensor and perform the required maintenance operations. This allows the user to learn about parts wear before it is too late and serious damage or even collateral damage occurs, without constantly needing to visually inspect those parts. As such, the current invention leads to a highly reliable as well as efficient way of monitoring the condition of bearings, gearboxes, and other moving parts in a crop processing section.

By repeatedly measuring the vibration pattern with the crop processing section in the same predetermined pseudo-operational condition, trends and changes in the vibration pattern can be determined reliably and accurately, thereby allowing for timely detection of possible wear of bearings, gearboxes, and other moving parts of the crop processing section. While a gradual increase of vibration amplitude may be the acceptable result of a normal ageing process, unexpected larger increases or increases above a predetermined threshold may trigger an alarm and indicate a need for some technical maintenance. This analysis may, e.g., use vibration patterns obtained from a plurality of agricultural harvesters, and advanced AI tools to better distinguish acceptable vibrations and vibrations that may indicate smaller or larger mechanical issues.

An exemplary method according to the invention further comprises updating the reference vibration pattern by storing at least a part of the established current vibration pattern as the reference vibration pattern. Over the lifetime of an agricultural harvester, parts of the crop processing section may be repaired or replaced. Such modifications and other substantial maintenance operations on the crop processing section or other parts of the agricultural harvester will change the overall vibration pattern of the machine. Similarly, vibration sensors may be added, removed, or replaced during the lifetime of the agricultural harvester. In such situations, it is desirable to replace at least the relevant portion of the reference vibration pattern by more recent data from the current vibration pattern. To ensure that the reference vibration pattern does not include any excessive vibration values caused by worn-out or broken parts, the reference vibration pattern (or parts thereof) is preferably only replaced after major repairs and maintenance operations.

In an embodiment of the method according to the invention the crop processing section comprises at least one rotatable element and bringing the crop processing section into the predetermined pseudo-operational configuration comprises rotating the rotatable element at a reference frequency. Alternatively, but preferably additionally, the crop processing section comprises at least one reciprocatable element, and bringing the crop processing section into the predetermined pseudo-operational configuration comprises reciprocating the reciprocatable element at a reference frequency.

For best results, the pseudo-operational configuration resembles an actual crop harvesting process as much as possible. The different predetermined reference frequencies for the different movable parts may, e.g., resemble frequencies common for a harvesting process at a common harvesting capacity for a high similarity to the normal use of the crop processing section. Alternatively, the reference frequencies used may be closer to the maximum possible frequencies that are typically used when harvesting at a very high or close to maximum harvesting capacity at which the highest vibration amplitudes are to be expected. In a more advanced method according to the invention, the vibrations may be monitored at multiple different reference frequencies. This, e.g., brings the advantage of a reduced chance to miss the detection of undesired vibrations that mainly occur at particular resonance frequencies.

In addition to continuously moving rotatable and reciprocatable parts of the crop process section, bringing the crop processing section into the pseudo-operational status may include bringing setting an adjustable element of the crop processing section to a reference position and/or reference orientation. Such adjustable elements may, e.g., comprises counter knife positions, sieve openings, or concave clearances.

In an exemplary method according to the invention the agricultural harvester is a combine harvester, and the crop processing section comprises at least one of the following units:
  a feeding section comprising a belt conveyor or auger bed,
  a threshing section comprising at least one threshing drum and/or threshing rotor,
  a cleaning section comprising at least one reciprocating sieve,
  a grain elevator,
  a residue processing section comprising straw walkers and/or a straw chopper.

When used with such a combine harvester, the pseudo-operational configuration may, e.g., comprise reciprocating the reciprocating sieve at a reference frequency, setting a sieve opening of the reciprocating sieve to a reference sieve opening, rotating the threshing drum and/or threshing rotor at a reference threshing frequency, or setting a concave clearance of a concave associated with the threshing drum and/or threshing rotor to a reference concave clearance.

According to a further aspect of the invention, a computer program is provided comprising instructions which, when executed by a computer, cause the computer to carry out a method as described above.

BRIEF DESCRIPTION OF THE DRAWINGS

Embodiments of the invention will now be described by way of example with reference to the accompanying drawings, in which.

DETAILED DESCRIPTION

Figure 1:
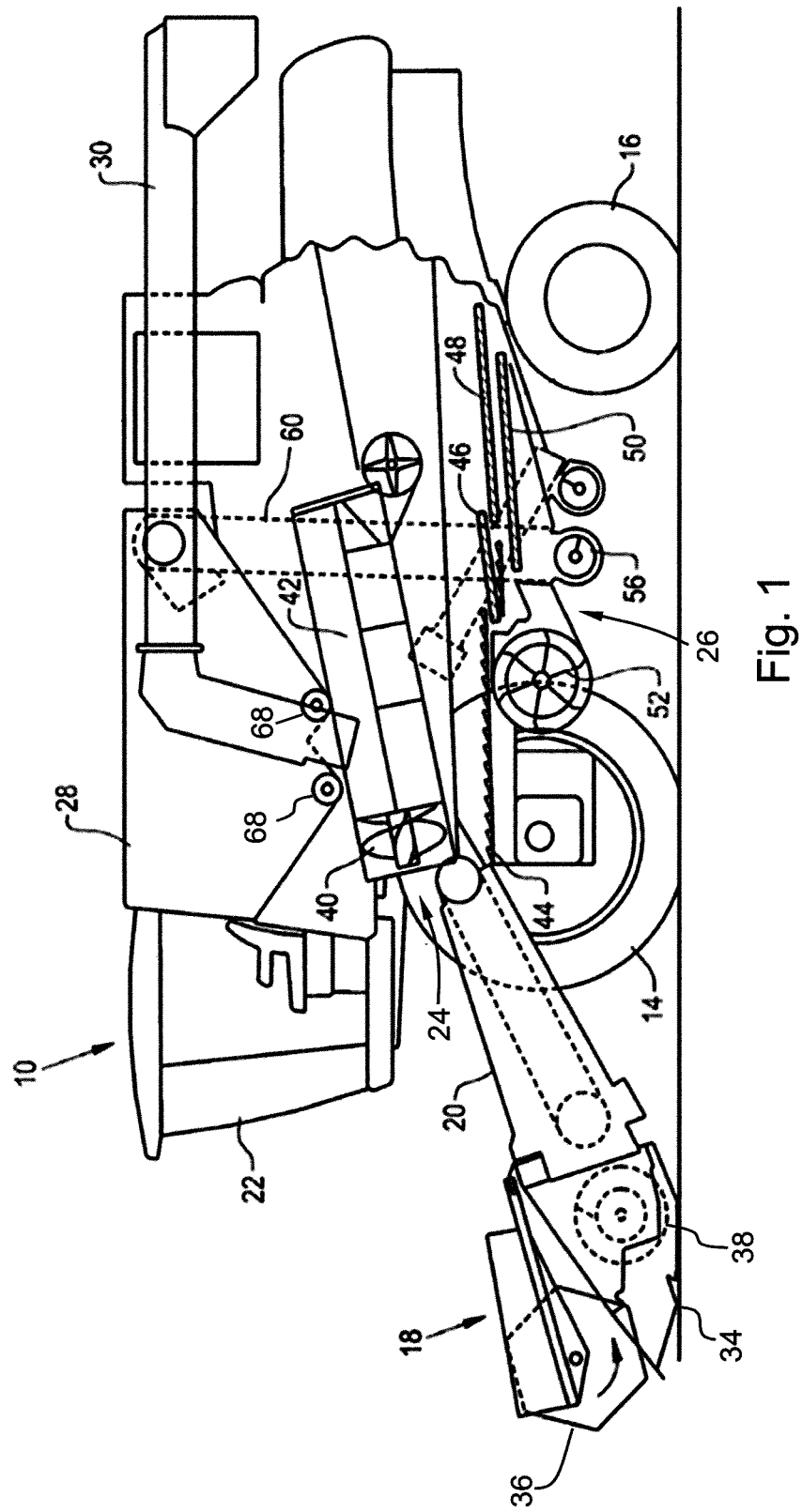
FIG. 1 shows a combine harvester wherein the method according to the invention may be advantageously used.

FIG. 1 shows an agricultural harvester in the form of a combine harvester 10, which generally includes front and rear round engaging wheels 14, 16, a header 18, a feeder 20, an operator cabin 22, a threshing and separation system 24, a cleaning system 26, a grain tank 28 and an unloading tube 30. It should be appreciated that while the agricultural harvester is shown as a combine harvester 10, the agricultural harvester according to the present invention may be embodied by any construction that allows for crop material to be harvested, such as a conventional combine (which does not have a rotor), rotary combine, hybrid combine, chopper harvester, etc.

A header 18 is mounted to the front of the combine harvester 10 and includes a cutter bar 34 for severing crops from a field during forward motion of the combine. A rotatable reel 36 feeds the crop into the header 18, and a double auger 38 feeds the severed crop laterally from each side towards the feeder 20. The feeder 20 conveys the severed crop to the threshing and separating system 24.

The threshing and separating system 24 is of the axial-flow type and comprises a threshing rotor 40 at least partially located and rotatable within a threshing concave 42. The threshing concave may take the form of a perforated concave. Grain from the severed crop is threshed and separated from the MOG by the action of the threshing rotor 40 within the threshing concave 42. Larger elements of MOG, such as stalks and leaves do not pass through the perforations in the threshing concave 42 and are discharged from the rear of the combine harvester 10. Grain and smaller elements of MOG (small MOG henceforth), such as chaff, dust and straw are small enough to pass through the perforations in the threshing concave 42 and are thence discharged from the threshing and separation system 24.

Grain and small MOG that has successfully passed the threshing and separating system 24 falls onto a preparation pan 44 and is conveyed towards the cleaning system 26. The cleaning system comprises a series of sieves and a cleaning fan 52. The series of sieves includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and oscillates in a for-to-aft manner too, such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. Once in the grain tank 28, grain tank augers 68 at the bottom of the grain tank convey the cleaned grain laterally within the grain tank 28 to an unloading tube 30 for discharge from the combine harvester 10.

Figure 2:
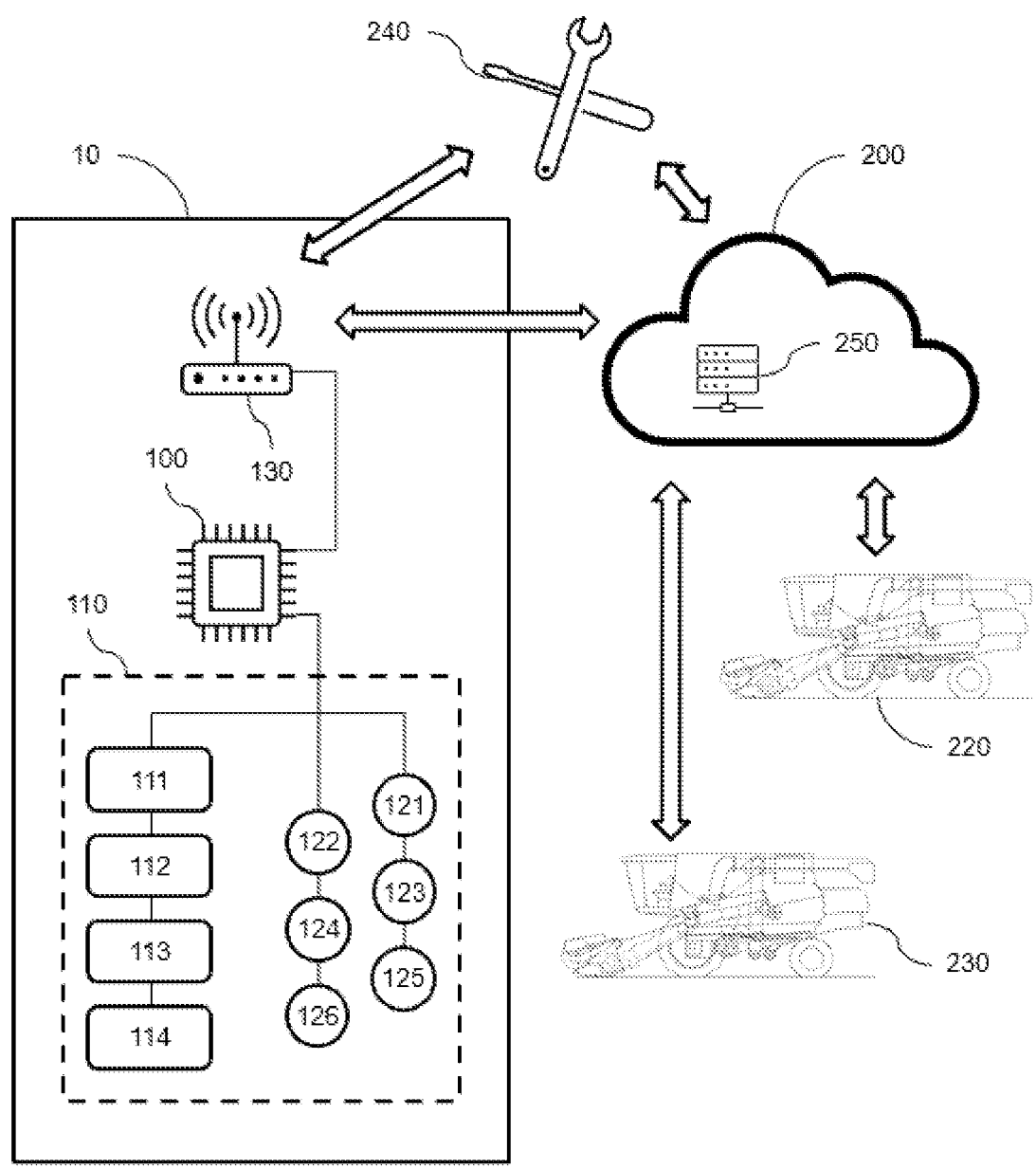
FIG. 2 shows a block diagram of a system wherein the method according to the invention may be implemented.

FIG. 2 shows a block diagram of a system wherein the method according to the invention may be implemented. The agricultural harvester is herein indicated by a rectangle with a plurality of interconnected features. For the exemplary embodiment discussed here, it is assumed that the agricultural harvester is a combine harvester 10. However, as described before, the invention is equally applicable to other agricultural harvesters with crop processing section, such as forage harvesters, round and square balers, grape harvesters, coffee harvesters, etc.

The combine harvester 110 comprises a crop processing section 110 with a plurality of crop processing features 111-114 and another plurality of vibration sensors 121-126. A controller or processor 100 configured to perform the method according to the invention is coupled to the crop processing features 111-114 and the vibration sensors 121-126 in order to communicate therewith. The coupling to the crop processing features 111-114 allows for controlling the operation, movement, and adjustment of all relevant aspects thereof. Additionally, information concerning, e.g., the operational status of the crop processing features 111-114, and the amount or constituents of the processed crop may be sent from the crop processing section 110 to the controller 100. The coupling to the vibration sensors 121-126 allows the controller 100 to monitor the detected vibrations and to store the reference vibration and current vibration patterns that are used for the current invention.

Examples of the movable and/or adjustable crop processing features 111-114 found in the combine harvester 10 of FIG. 1 are the reel 36, cutter bar 34 and double auger 38 of the header 18, the crop conveyor in the feeder 20, the threshing rotor 40 and concave 42 of the threshing section 24, the preparation pan 44, pre-cleaning sieve 46, and upper and lower sieves 48, 50 of the cleaning section 26, the clean grain auger 56 positioned under the lower sieve 48, the clean grain elevator 60 that transports the cleaned grain to the grain tank 28, grain tank augers 68 in the grain tank, augers or conveyor belts in the unloading tube 30, straw choppers, and straw or chaff spreaders. All or some of these crop processing features 111-114 can be moved and/or adjusted when putting the crop processing section 110 into a pseudo-operational configuration.

The vibration sensors 121-126 may have a wired connection to the controller 100 but are preferably wireless sensors that can communicate with the controller 100, e.g., via local Wi-Fi, Bluetooth, or other suitable technologies. The vibration sensors 121-126 may, e.g., be powered by a central battery of the combine harvester 10, or by separate batteries comprised in the vibration sensor units 121-126 themselves. When a vibration sensor 121-126 provides its own power source and communicates wirelessly with the controller 100, this brings the advantage that vibration sensors 121-126 can easily be added, removed, or repositioned when so desired. Even more advanced vibration sensors 121-126 may use, e.g., piezoelectric material to convert the vibrational energy of the crop processing section 110 into electricity that can power the internal batteries of the vibration sensors 121-126. Such sensors can be completely wireless without requiring replacement or battery replacement at any time.

The controller 100 is preferably connected to a wireless transceiver 130 that connects the combine harvester's control systems to a larger network 200 of combine harvesters 220, 230. This larger network 200 may, e.g., be part of the Internet or a more local proprietary network. Connection to a larger network 200 allows the combine harvester 10 to store backup data separate from the from and to share and compare its data with other combine harvesters 220, 230. Software running at a remote server 250 may gather and analyse data from a plurality of agricultural harvesters 10, 220, 230. This analysis may, e.g., use advanced AI tools to find links between particular vibration patterns and specific mechanical problems or solutions. The remote server may further advise the user of the combine harvester 10 to add or reposition one or more vibration sensors 121-126 when data from other combine harvesters 220, 230 suggests that this may improve the performance of the vibration monitoring system. Optionally, the network connection may allow for automatically contacting a dealer or service technician 240 to order new parts or arrange someone to come over for an in-person visual inspection of the combine harvester 10. Alternatively, a connection to the dealer or service technician 240 is established directly by the wireless transceiver 130 of the combine harvester 10.

Figure 3:
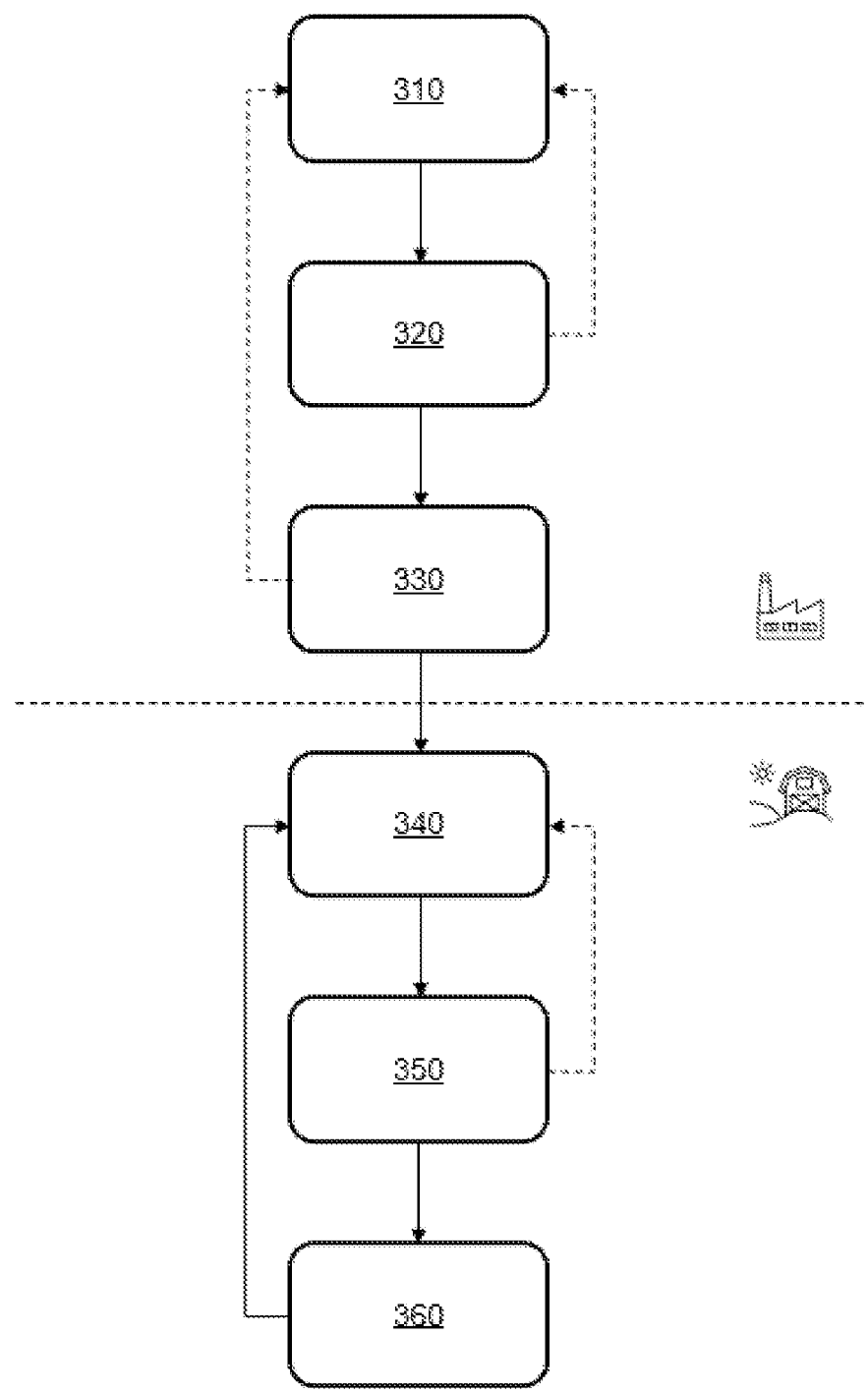
FIG. 3 shows a flow chart of an exemplary method according to the invention.

FIG. 3 shows a flow chart of an exemplary method according to the invention. In a first step 310 the crop processing section 110 of the combine harvester 10 is brought into a predetermined pseudo-operational configuration.

The pseudo-operational configuration mimics the operational status of the combine harvester 10 and its crop processing section 110 during an actual harvesting operation. Rotatable and reciprocatable elements of the crop processing section are run at predetermined frequencies, comparable to their operation frequencies when used in the field. Adjustable elements of the crop processing sections may be brought into a position and/or orientation that also represents normal use. An important difference between the pseudo-operational status and an actual operational status is that no crop is harvested or processed. The functional units of the combine harvester 10, in particular those of the crop processing section 110, run as if an actual harvesting process is going on, while the combine harvester 10 is standing still on a preferably horizontal surface.

As described above, bringing the crop processing section 100 into the predetermined pseudo-operational configuration may involve rotating rotatable elements, such as the reel 36 and the augers 38 of the header 18, a conveyor belt or auger bed in the feeder 20, a threshing rotor 40, a cleaning fan 52, a clean grain auger 56, a grain elevator 60, grain tank augers 68, augers or conveyor belts in the unload tube 30, a straw beater, a straw chopper, and/or straw and chaff spreaders. Each of those elements will be rotated at a frequency that is typical for its use during an actual harvesting operation in the field. Additionally, reciprocating elements, such as the cutter bar 34 of the header 18, the preparation pan 44 and the pre-cleaning, upper and lower sieves 46, 48, 50 of the cleaning section 26 will start moving at their predetermined pseudo-operational frequencies.

For best results, the pseudo-operational configuration resembles an actual crop harvesting process as much as possible. The different predetermined reference frequencies for the different movable parts may, e.g., resemble frequencies common for a harvesting process at a common harvesting capacity for a high similarity to the normal use of the crop processing section 110. Alternatively, the reference frequencies used may be closer to the maximum possible frequencies that are typically used when harvesting at a very high or close to maximum harvesting capacity at which the highest vibration amplitudes are to be expected. In a more advanced method according to the invention, the vibrations may be monitored at multiple different reference frequencies. This, e.g., brings the advantage of a reduced chance to miss the detection of undesired vibrations that mainly occur at particular resonance frequencies.

To closely resemble an actual harvesting operation, some elements that are adjustable in position or orientation may be brought into a pseudo-operation configuration too. For example, the header 18 may be lifted of the ground, the concave clearance between the threshing rotor 40 and the threshing concave 42 may be adjusted, and sieve openings may be opened.

In a second step 320, while in the predetermined pseudo-operational configuration, the vibration sensors 121-126 are used to establish and store a reference vibration pattern. This reference vibration pattern is then stored locally in a memory of the combine harvester 10 and/or remotely on a server 250. Optionally, the first two steps 310, 320, are repeated for establishing reference vibration patterns at two or more different pseudo-operation configurations. For example, the reference vibration pattern may be determined with the combine harvester 10 and crop processing section 110 running in a low-, mid-, and high-capacity configuration.

When the reference vibration pattern(s) is (are) determined for a new combine harvester 10, it (they) can, in a third step 330, be compared to previously determined reference vibration patterns of similar agricultural harvesters 220, 230 to detect any mechanical problem or defect in the combine harvester 10 being tested. For useful comparisons between reference vibration patterns of different combine harvesters, it is preferred that the positioning of the vibration sensors 121-126 and the exact settings of the pseudo-operational configuration is standardised. However, with sufficiently advanced, possibly AI based, analysis tools, useful comparisons between different vibration sensor set-ups and even different types of combine harvesters 10 are possible too. If any repairs or modifications are deemed necessary, they will be performed. Preferably, after such modifications have been made, the first three steps 310, 320, 330 are performed again to ensure that the combine harvester 10 leaves the factory in top condition and with a reference vibration pattern that corresponds to the actual condition of the machine.

The first three steps 310, 320, 330 of bringing the crop processing section 110 into the predetermined pseudo-operational configuration, determining the reference vibration pattern, and comparing the reference vibration pattern to data available from other combine harvesters 220, 230 are preferably performed in the factory, just after the combine harvester 10 leaves the production line. After that, the combine harvester 10 leaves for the farm where it can be used in the field. Over the lifetime of the combine harvester 10, the vibration pattern will change. This change can both be gradual because of, e.g., part wear and loosening belts, screws and bolts, and more sudden in the event of mechanical defects. Therefore, preferably on a regular basis, the combine harvester 10 is brought back into the pseudo-operational configuration in the fourth step 340 of the method represented by the flow chart of FIG. 3. This fourth step 340 is preferably performed in conditions that are as close as possible to the condition under which the reference vibration pattern was established before. The combine harvester 10 is placed on a horizontal surface with its grain tank empty and all relevant parts of the crop processing section 110 are brought into the same position, moving at the same frequencies.

When the combine harvester 10 is brought back in its pseudo-operation configuration, all vibration sensors 121-

126 are read out again to establish and store a current vibration pattern in step 350. Again, the storage of this vibration pattern may be done locally as well as remotely. If needed, multiple current vibration patterns may be established with the combine harvester 10 in different predetermined pseudo-operational conditions.

Then, in a sixth step 360, the newly established current vibration pattern is compared to the previously stored reference vibration pattern and/or to previously stored current vibration patterns. This comparison may be performed by the controller 100 of the combine harvester 10, by a remote server 250, or by a combination of both. Based on this comparison, the controller 100 may provide an output signal representative of a change of vibration pattern of the crop processing section 110. For example, when the vibration amplitude of one of the vibration sensors 121-126 exceeds the vibration amplitude stored in the reference vibration pattern by more than a predetermined percentage, an alarm signal may be communicated to the user, indicating which sensor 121-126 recorded the excessive vibrations. The user can then choose to inspect the parts of the crop processing section 100 associated with that vibration sensor 121-126 and perform the required maintenance operations. This allows the user to learn about parts wear before it is too late and serious damage occurs, without constantly needing to visually inspect those parts. As such, the current invention leads to a highly reliable as well as efficient way of monitoring the condition of bearings, gearboxes, and other moving parts in the crop processing section 110 of the harvester 10.

When repairs, modifications, or other maintenance operations are performed, this is possibly followed by a return to the fourth step 340 wherein the combine harvester 10 is brought back into the pseudo-operational configuration such that a new current vibration pattern can be established. By repeatedly measuring the vibration pattern with the crop processing section 110 in the same predetermined pseudo-operational condition, trends and changes in the vibration pattern can be determined reliably and accurately, thereby allowing for timely detection of possible wear of bearings, gearboxes, and other moving parts of the crop processing section 110. While a gradual increase of vibration amplitude may be the acceptable result of a normal ageing process, unexpected larger increases or increases above a predetermined threshold may trigger an alarm and indicate a need for some technical maintenance.

When changes are made to the crop processing section and/or to the vibration sensor setup, the sixth step 360, wherein the current vibration pattern is processed, may further involve updating the reference vibration pattern by storing at least a part of the established current vibration pattern as the reference vibration pattern. Over the lifetime of the combine harvester 10, parts of the crop processing section 110 may be repaired or replaced. Such modifications and other substantial maintenance operations on the crop processing section 110 or other parts of the combine harvester 10 will change the overall vibration pattern of the machine. Similarly, vibration sensors 121-126 may be added, removed, or replaced during the lifetime of the combine harvester 10. In such situations, it is desirable to replace at least the relevant portion of the reference vibration pattern by more recent data from the current vibration pattern. To ensure that the reference vibration pattern does not include any excessive vibration values caused by worn-out or broken parts, the reference vibration pattern (or parts thereof) is preferably only replaced after major repairs and maintenance operations.

The invention claimed is:

1. A method of determining a vibration pattern in a crop processing section of an agricultural harvester, the method comprising:
    operating the crop processing section at a predetermined pseudo-operational configuration by (i) rotating at least one rotatable element of the crop processing section at a reference frequency, (ii) reciprocating at least one reciprocatable element of the crop processing section at the reference frequency, or (iii) setting at least one adjustable element of the crop processing section to a reference position or a reference orientation,
    when in the predetermined pseudo-operational configuration, using a plurality of vibration sensors to establish a reference vibration pattern, and
    storing the established reference vibration pattern in a memory.

2. The method according to claim 1, further comprising:
    operating the crop processing section at the predetermined pseudo-operational configuration a second time, and
    when in the predetermined pseudo-operational configuration, using the plurality of vibration sensors to establish a current vibration pattern.

3. The method according to claim 2, further comprising:
    comparing the established current vibration pattern to the established reference vibration pattern, and
    based on the comparison, providing an output signal representative of a change of vibration pattern of the crop processing section.

4. The method according to claim 2, further comprising updating the established reference vibration pattern by storing at least a part of the established current vibration pattern as the established reference vibration pattern.

5. The method according to claim 1, wherein the agricultural harvester is a combine harvester, and the crop processing section comprises at least one of the following units:
    a feeding section comprising a belt conveyor or auger bed,
    a threshing section comprising at least one threshing drum or threshing rotor,
    a cleaning section comprising at least one reciprocating sieve,
    a grain elevator, and
    a residue processing section comprising straw walkers or a straw chopper.

6. The method according to claim 5, wherein the at least one reciprocatable element of the crop processing section comprises the at least one reciprocating sieve.

7. The method according to claim 5, wherein the at least one adjustable element comprises a sieve opening of the at least one reciprocating sieve.

8. The method according to claim 5, wherein the at least one rotatable element comprises the at least one threshing drum or threshing rotor.

9. The method according to claim 5, wherein the at least one adjustable element comprises a concave clearance of a concave associated with the at least one threshing drum or threshing rotor.

10. A computer program comprising instructions which, when executed by a computer, cause the computer to carry out the method of claim 1.

11. A method of determining a vibration pattern in a crop processing section of an agricultural harvester, the method comprising:
    operating the crop processing section at a predetermined pseudo-operational configuration by reciprocating at least one reciprocatable element of the crop processing section at the reference frequency, when in the predetermined pseudo-operational configuration, using a plurality of vibration sensors to establish a reference vibration pattern, and storing the established reference vibration pattern in a memory.

12. A method of determining a vibration pattern in a crop processing section of an agricultural harvester, the method comprising:

operating the crop processing section at a predetermined pseudo-operational configuration by setting at least one adjustable element of the crop processing section to a reference position or a reference orientation, when in the predetermined pseudo-operational configuration, using a plurality of vibration sensors to establish a reference vibration pattern, and storing the established reference vibration pattern in a memory.

\* \* \* \* \*